Oct. 23, 1945.        B. O. WATKINS ET AL        2,387,372
                   CIRCUIT DISCONNECTING DEVICE
                       Filed June 5, 1942

INVENTORS
BRUCE O. WATKINS
JOHN F. ATKINSON
BY
    Wm H. Atkinson
              ATTORNEY Patented Oct. 23, 1945

2,387,372

UNITED STATES PATENT OFFICE 2,387,372

CIRCUIT DISCONNECTING DEVICE

Bruce O. Watkins, Brentwood, Mo., and John F. Atkinson, Cambridge, Mass.

Application June 5, 1942, Serial No. 446,000

7 Claims. (Cl. 200—108)

Our present invention relates to a new and improved zero current circuit disconnecting device and more particularly to an electric power distribution system in which our zero current disconnecting device is used in connection with an automatically operating reclosing circuit breaker to disconnect a faulty or overloaded circuit from the distribution system.

An object of our invention is to provide a simple and inexpensive device, which in the event of a continuing fault or overload, will operate in conjunction with an automatically operating reclosing circuit breaker to disconnect the faulted or overloaded circuit from the remaining portion of the distribution system in a practical and effective manner.

Another object of our invention is to provide a power distribution system in which our improved disconnecting device is used in conjunction with an automatically operating reclosing circuit breaker of a conventional design to provide for a disconnection of a fault or overload portion of the distribution system from the remaining portion of the system prior to a subsequent reclosing operation of the reclosing circuit breaker.

Another object of our invention is to provide a new and novel circuit disconnecting device which may be used in conjunction with a reclosing circuit breaker of the conventional type having an operating cycle that includes a plurality of circuit opening and reclosing operations and which will operate to successively disconnect outlying portions of the distribution system in event of a sustained fault or overload occurring upon an outlying portion of the distribution system.

At the present time where fault or overload protection of the nature contemplated by our invention is desired it is the practice to provide a plurality of individual reclosing circuit breakers at different points throughout the system and to regulate the operation of these several reclosing circuit breakers, through the medium of timing relays, so that the reclosing circuit breaker nearest the fault or overloaded portion of the system will operate to disconnect the fault or overloaded portion of the system. This arrangement requires the use of a number of reclosing circuit breakers each having complicated operating mechanisms, timing relays and oil immersed contacts with arc extinguishing means and therefore renders such a system expensive and not economically adaptable to rural power distribution systems. It is therefore a further object of our invention to provide a device and a system of power distribution which will overcome the above difficulties and in which a single reclosing circuit breaker operating in conjunction with any number of our improved disconnecting devices may be employed to isolate any faulty or overloaded circuit from the remaining portion of the distribution system in a new and novel manner.

The power distribution system, when equipped with one or more of our improved zero current disconnecting devices in association with a reclosing circuit breaker, as contemplated by our present invention differs in many respects from the present arrangements of the prior art. For example, when a continuing fault or overload occurs on a branch line circuit the disconnecting device of that particular branch line will be initially influenced by said fault or overload condition and also upon each reclosing operation of the main reclosing circuit breaker as long as said fault or overload condition exists, but in these operations the disconnecting device, unlike a fuse or circuit breaker of conventional type, will not operate to open its circuit control contacts until the reclosing circuit breaker has operated a predetermined number of times. Then when the disconnecting device does open its circuit controlling contacts this will occur during a period of zero current when the reclosing circuit breaker associated therewith is in its open circuit position. As a result if the fault or overload condition is removed from the branch line before the reclosing circuit breaker has completed a predetermined portion of its operating cycle the disconnecting device will remain closed and also reset itself for a similar series of responses should a subsequent fault or overload condition occur upon this particular branch line. An advantage of this feature is that the branch line disconnecting devices do not require oil immersed contacts or arc extinguishing protection such as would be required if its contacts were opened at a time when the main reclosing circuit breaker is in its closed circuit position. Therefore, the disconnecter can be mounted in a simple porcelain bushing or any other type of enclosure in a simple and inexpensive manner.

Another advantage of our device and system is that any number of the disconnecting devices may be employed in conjunction with a single reclosing circuit breaker and in this way it will be possible to provide effective fault and overload protection upon any number of branch lines leading from a single feeder circuit.

In the above described arrangement it is contemplated that only one of our improved disconnecting devices will be installed between the reclosing circuit breaker and a point of fault or overload in the system. However, it is also contemplated that two or more of our disconnecting devices may be employed in series by adjusting their operating characteristics, as will be hereinafter pointed out, to provide for a successive disconnection of remote portions of the circuit in the event of a fault upon an outlying branch line or feeder section of the system.

Our invention will be better understood from the following description when taken in connection with the accompanying drawing which schematically illustrates a device having the elements capable of operating in accordance with our invention and diagrammatically illustrates distribution systems in which our improved disconnecting device is shown as operating in conjunction with a reclosing circuit breaker of conventional type.

Figure 1:
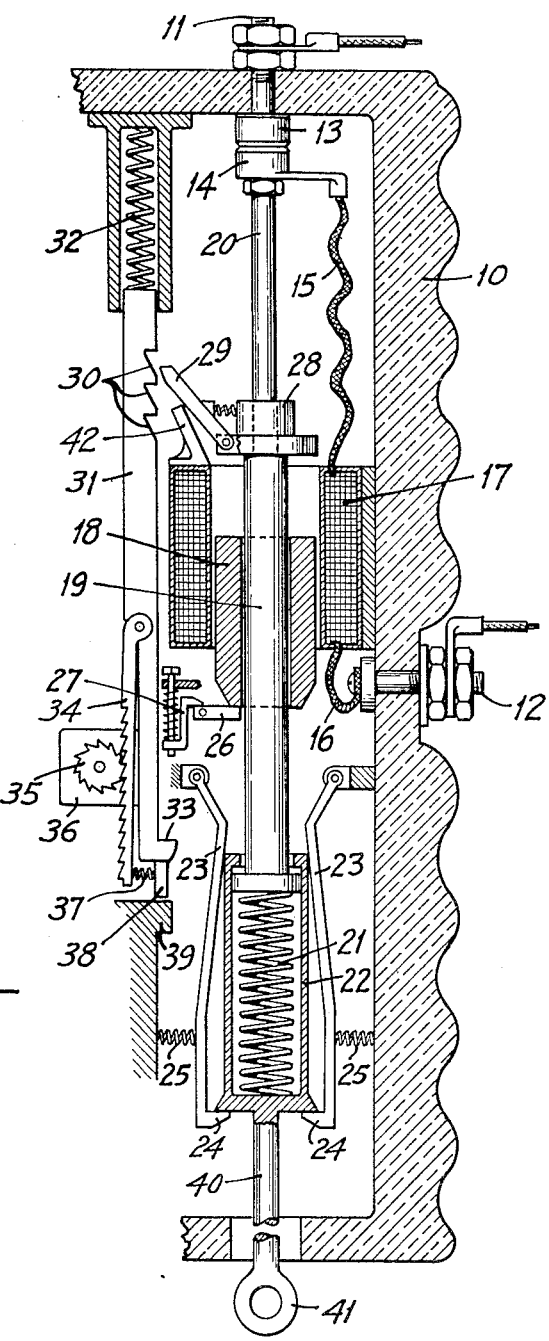
Figure 1 is a schematic illustration of a device having cooperative elements capable of operating in accordance with our invention.

For the purpose of describing our invention we have in the drawing diagrammatically illustrated a device having elements that are adapted to operate in such a manner as to accomplish the results desired. In connection with this illustration it should be understood that it is not considered to show a device such as might be ultimately designed to accomplish the purpose intended. In other words the drawing is submitted merely to illustrate the principles of operation of a device such as might be used in accordance with our invention and while it is contemplated that a device constructed in accordance with our invention may be found useful in other fields of application it is considered that it will find its most frequent use in connection with distribution systems having circuits that are additionally protected by an automatically operating reclosing circuit breaker of the type having a predetermined operating cycle that will provide for a series of circuit opening and reclosing operations in the event of a sustained fault or continuing overload upon that portion of the distribution system which the reclosed circuit breaker is intended to protect.

As shown in Figure 1 the numeral 10 designates a suitable bushing or other type of insulating support in which or upon which the various elements of our device may be mounted. As shown the bushing 10 has a terminal 11 at its upper end and at one side midway its end it has a second terminal 12. The terminal 11 extends inwardly and connects with a stationary contact 13 with which a relatively movable contact 14 is adapted to cooperate. Connected in series between the relatively movable contact 14 and the terminal 12 by means of a flexible connection 15 and a conductor 16 there is an electromagnetic field producing coil 17 that is arranged to attract a vertically movable armature 18 which is adapted to slide freely along a vertically extending rod-like member 19. This rod-like member 19 has a reduced end portion 20 upon which the relatively movable contact 14 is mounted and it is shown as held in its uppermost position by means of a compression spring 21 that is positioned within a cylindrical member 22 which telescopes over the lower end of the rod-like member 19. This cylindrical member 22 is in turn held in an elevated position by means of suitable levers 23 that carry latching fingers 24 at their lower ends which engage the lower end of the cylindrical member 22. Springs 25 are provided for biasing these levers 23 into their operative position. In this manner the cylindrical member 22 is held in its uppermost position by the levers 23 and at the same time the compression spring 21 will maintain the vertical movable rod-like member 19 in its elevated position where the relatively movable contact 14 will be held in circuit established contact with the stationary contact 13 at the upper end of the bushing 10.

Under normal operating conditions the vertically movable armature 18 will be supported in operative relation with respect to the electromagnetic coil 17 by means of a releasable support 26 that is controlled by a spring pressed latch 27. Mounted in cooperating relation with the vertical movable armature 18 the reduced portion 20 of the vertical movable rod-like member 19 also carries a slidable collar 28 that is adapted to be lifted a predetermined distance each time armature 18 is attracted by the electromagnetic field producing coil 17, as upon each occurrence of a fault or overload current condition in the circuit controlled by the contacts 13 and 14. This vertically movable collar 28 in turn carries a spring pressed outwardly disposed dog 29 that is adapted to engage in notches 30 provided in a rack bar 31 which is mounted for vertical movement adjacent thereto. The rack bar 31 is biased downwardly by means of a compression spring 32 which is suitably mounted thereabove. At this lower end the rack bar 31 carries an inwardly extending foot 33 that is adapted to engage the spring pressed latch 27 and operate it to release the support 26 which holds the armature 18 in cooperating relation with the electromagnetic field producing coil 17. In order to provide for engagements of the dog 29 with the successive notches 30 of the rack bar 31, as in the event of a continuing fault or overload, the rack bar 31 carries a hinged outwardly biased controlling rack 34 which is held in engagement with a retarding ratchet wheel 35 of a timing device 36 by means of a spring 37. When in its lowermost position the rack bar 31 will be held in the position shown by means of a downwardly extending stop member 38 that is adapted to engage with any suitable abutment 39 supported by the bushing 10. With this arrangement it will be seen that when the rack bar 31 is notched upwardly by vertical movement of the dog 29 through three successive operations of the armature 18 the extending foot 33 will engage the spring pressed latch 27 and release the armature supporting member 26. This will permit the armature 18 to drop downwardly and out of cooperating relation with respect to the electromagnetic field producing coil 17. As the armature 18 thus drops downwardly it will engage the levers 23 and move them outwardly against the action of their biasing springs 25 and release the cylindrical member 22. When the cylindrical member 22 is thus released this entire assembly including the compression spring 21 and the vertically extending rod-like member 19 will drop down and thus separate the contacts 13 and 14 from each other and open the circuit between the terminals 11 and 12 of the disconnecting device. At this point it should be stated that the armature 18 is adapted to respond only to overload current values and will be free to drop downwardly as above described only when the electromagnetic field producing coil 17 is deenergized, therefore the circuit through the contacts 13 and 14 cannot be opened until the circuit therethrough is opened at another point and a condition of zero current exists therein. Such a zero current condition may be produced by a reclosing circuit breaker which in accordance with the preferred embodiment of our invention will be connected in series and between our disconnecting device and the source of electric power. When the reclosing circuit breaker is of the type providing for a predetermined number of circuit reclosing operations it will be seen that upon each opening operation of the reclosing circuit breaker there will be a zero current condition, but due to the provision of the tripping arrangement as embodied in our device the circuit controlling contacts 13 and 14 will not be rendered operative to open the fault or overloaded circuit until after the reclosing circuit breaker has operated to reclose the faulted or overloaded circuit a predetermined number of times. This timing control also insures that the armature 18 will be attracted the required number of times by the magnetic field produced by the fault or overload current passing through the electromagnetic field coil 17. When the automatically operated reclosing circuit breaker has on operating cycle adapted to produce at least three circuit reclosing operations it will be seen that after the reclosing circuit breaker has operated through two complete reclosing operations the armature 18 will be free, except for the magnetic attraction of the field produced by the coil 17, to drop down and engage the levers 23 and release the cylindrical member 22. Then upon the third opening operation of the reclosing circuit breaker, assuming that these operations occur in response to a continuing fault or overload, the coil 17 will become deenergized and the armature 18 will drop down, engage the levers 23, and release the cylindrical member and thus permit the disconnector contacts 13 and 14 to open their circuit. As the reclosing circuit breaker then completes its operating cycle and closes its contacts for the third reclosing operating the remaining portion of the system will be reestablished independently of the disconnected fault or overloaded portion of the system.

After a complete operation of our device has occurred as above described and the fault or overloaded circuit has been disconnected from the distribution system and after the fault or overload has been corrected the disconnecting device may be reset to repeat a similar operation by pushing upwardly on a reset rod 40 which extends through an opening in the bottom of the bushing 10. This reset rod 40 is shown as having a ring 41 formed at its outer end which may be engaged by a hot stick or switch operating pole in accordance with the standard practice.

During this resetting operation it will be understood that the cylindrical telescoping member 22 will be moved upwardly, by the application of force through the medium of a hot stick or other means, a distance sufficient to bring its upper end into engagement with the vertically movable armature 18 and move it upwardly a distance sufficient to reset it, as illustrated in the drawing, upon its releasable support 26. Otherwise the levers 23 will be incapable of returning to their normal positions with their latching fingers 24 in latching relation with the bottom of the cylindrical member 22. This additional upward movement of the cylindrical member 22 is provided for by a compression of the spring 21 which has been described as interposed between the vertically movable rod-like member 19 and as disposed within the cylindrical housing 22.

Since it is conceivable that the fault or overload condition may be overcome or removed from the circuit by one of the initial operations of the reclosing circuit breaker before the rack bar 31 has been notched up to a point where it will trip the mechanism as described and prior to an opening of the circuit controlling contacts 13 and 14, the dog 29 is shown as normally held out of engagement with the notches 30 of the rack bar 31 by a rest 42 that extends upwardly from the coil 17. This will permit the rack bar 31 to return to its initial position free of the dog 29 should the reclosing circuit breaker remain closed for a time period greater than that permitted by the timing device 36 for the return of the rack bar 31 to its initial position.

At the present time it is the practice to time the reclosing operations of an automatically operating reclosing circuit breaker so as to give an immediate reclosing and a series of time delayed reclosures the period of which customarily range from 5 to 30 seconds. In view of this fact it is contemplated that the timing means 36 of our device will be adjusted to delay the downward or return movement of the rack bar 31 in such a manner that with any time period not greater than the longest period of delay provided for in the reclosing operation of the reclosing circuit breaker the dog 29 will be adapted to engage the successive notches 39 upon the rack bar 31. By providing the rack bar 31 with one less notch 30 than the number of reclosing operations for which the reclosing circuit breaker is designed it will be seen that after our disconnecting device has opened its contacts 13 and 14 the reclosing circuit breaker will be free of the fault of overload current condition and upon its next reclosing will remain in its closed circuit position. At the same time the reclosing circuit breaker can then reset itself for a subsequent operating cycle which will include its full number of circuit reclosing operations in the event that a fault or overload condition should develop in some other portion of the distribution system. At this point it will be understood, in the event the fault or overload is removed from a branch line being protected by one of our disconnecting devices, prior to an opening of its contacts 13 and 14, that the dog 29 will engage the rest 42 where it will be held out of engagement with the rack bar 31 and thus the rack bar 31 will be free to return to its initial position. The device will then be reset to again repeat its full cycle of notching operations before its contacts 13 and 14 can be operated to open the circuit. As will be hereinafter pointed out it is contemplated that the rack bar 31 may be provided with any desired number of notches 30 and that one or more of our disconnecting devices may be used in series in a single circuit to provide for a successful disconnection of outlying portions of the circuit. In such an arrangement the rack bars 31 of the several disconnecting devices will be provided successively with one less notch as the outer end of the circuit is approached.

Figure 2:
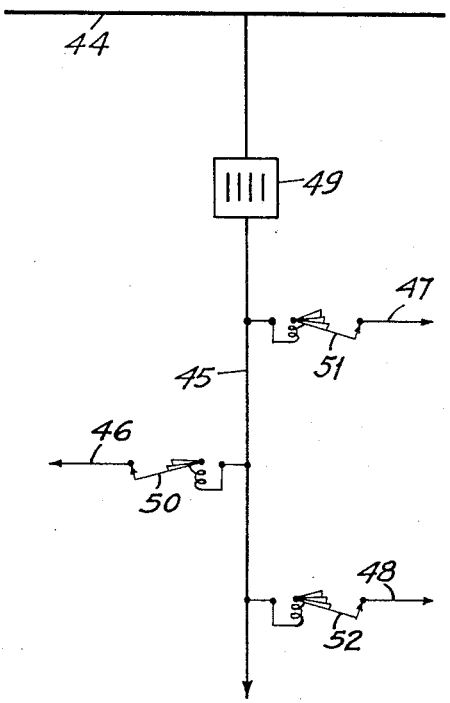
Figure 2 is a diagrammatic illustration of a power distribution system showing a preferred embodiment of our invention.

Reference is now made to Figure 2 of the drawing for a more detailed description of a system of distribution employing a number of our disconnecting devices in connection with an automatically operating reclosing circuit breaker having an operating cycle capable of producing an initial circuit opening operation and three additional opening operations before it is locked out as would be the case in the event of a permanent fault or overload. The system here illustrated includes a main power circuit 44, a feeder circuit 45 from which branch lines 46, 47 and 48 extend for the purpose of supplying power to outlying consumer areas. In this particular arrangement the feeder circuit 45 has an automatic reclosing circuit breaker 49 which is indicated by vertical marks is of the type having an operating cycle capable of producing four complete opening operations of the feeder circuit 45 in the event of a sustained fault or overload thereupon, after which it is adapted to become locked in its open circuit position. The branch line circuit 46 which extends to the left from the feeder circuit 45 is shown as having one of our disconnecting devices, designated by the numeral 50, as of a type having a rack bar 31 with only two dog engageable notches 30 formed therein and the branch line circuits 47 and 48 are shown respectively as having disconnecting devices 51 and 52 of the type having three notching operations. These disconnecting devices 50, 51 and 52 as will be readily understood will operate independently of each other and serve to disconnect the branch lines 46, 47 or 48 from the feeder circuit 45 in the event of a fault or overload condition at a point within the area supplied by power through its particular branch line. With this arrangement it will be seen that should a fault or overload condition occur upon branch line 46, the tripping mechanism of the disconnecting device 50 will be notched up twice and upon the next opening operation of the reclosing circuit breaker 49 the disconnecting device 50 will open its contacts 13 and 14 and thus disconnect the branch line 46 from the feeder circuit 45. Following this operation the reclosing circuit breaker 49 will complete its next reclosing operation and remain closed and current will then flow through feeder circuit 45 to the branch lines 47 and 48 in an uninterrupted manner. During this operation of the disconnecting device 50 it will be understood that since the fault or overload condition exists only upon the branch line 46 that the disconnecting devices 51 and 52 in the branch lines 47 and 48 will remain inoperative and consequently when the reclosing circuit breaker 49 completes its second circuit reclosing operation it will remain closed and reestablish the feeder circuit 45 and permit the distribution of power to the remaining branch lines 47 and 48 of the distribution system. In the event of a fault or overload upon either of the branch lines 47 or 48 it will be understood that the disconnecting device 51 or the disconnecting device 52 will operate in the manner above described as the reclosing circuit breaker 49 operates in response to the fault or overload condition, but unlike the disconnecting device 50 these latter disconnecting devices will be required to operate through one additional notching step before their circuit controlling contacts 13 and 14 are opened. This opening operation of the contacts 13 and 14 will then occur during the zero current period immediately following the third opening operation of the reclosing circuit breaker 49. As a result when the reclosing circuit breaker 49 recloses on its next operation it will reestablish the distribution of power to the remaining portions of the feeder circuit 45 and its connecting branch lines.

Figure 3:
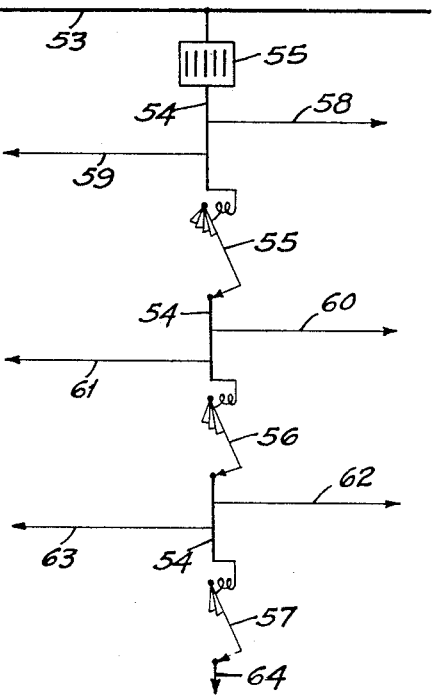
Figure 3 is a similar illustration showing a distribution system employing circuit disconnecting devices modified in accordance with a further embodiment of our invention.

In Figure 3 of the drawing there is diagrammatically shown a power distribution system in which a number of our improved zero current disconnecting devices are used in series to sectionalize a power distribution feeder circuit. As here shown the distribution system including a main power supply circuit 53 having a feeder circuit 54 that is connected thereto through an automatically operating reclosing circuit breaker 55 which is indicated by vertical lines as of the type having an operating cycle that will provide at least five circuit reclosing operations. Connected in the feeder circuit 54 there is a series of three of our disconnecting devices, designated respectively by numerals 55, 56 and 57 and which serve to sectionalize the feeder circuit 54 at three different points. The section of the feeder 54 immediately adjacent the reclosing circuit breaker 55 is shown as having branch lines 58 and 59 and the section of the feeder 54 immediately following the disconnecting device 55 is arranged to supply power to branch lines 60 and 61 while the section of the feeder 54 immediately beyond the reclosing device 56 is shown as arranged to supply power to branch lines 62 and 63. A branch line 64 or a further extension of the feeder circuit 54 is shown as connected to the distribution system beyond the disconnecting device 57. In this arrangement it will be noted that the disconnected devices 55, 56 and 57 are each shown as successively having one less notching step as the outer end of the feeder circuit 54 is approached. In other words the disconnecting device 55 is diagrammatically indicated as having four notches in its notching bar 31 and therefore it will not operate to open its circuit controlling contacts 13 and 14 until the zero current period which will occur upon the fourth opening operation of the reclosing circuit breaker 55. In the same manner the disconnecting device 56 is shown as of the type having three notches in its rack bar 31 and it will therefore open its circuit controlling contacts 13 and 14 during the zero current period which will occur upon the third opening operation of the reclosing circuit breaker 55. The disconnecting device 57 differs from the disconnecting devices 55 and 56 in that it is a type having a rack bar with only two notches therein and therefore it will operate to open its circuit controlling contacts during the zero current period which will occur during the second opening operation of the reclosing circuit breaker 55. In this manner it will be seen that in the event of a fault or overload upon the branch line 64 or on any further extension of the feeder circuit 54 the disconnecting device 57 will operate to disconnect this fault or overload from the distribution system. In the same manner should a fault or overload occur upon the branch lines 60—61 or 62—63 the disconnecting devices 55 and 56 respectively will operate to open their circuit controlling contacts 13 and 14 to thus disconnect the adjacent extending portion of the feeder circuit 54 from the distribution system. With this arrangement it will be understood that additional disconnecting devices may be provided in each of the branch lines 58 to 63 inclusive if desired. In such a case these additional disconnecting devices should preferably be of a type having one less notching step than the next succeeding disconnecting device between it and the reclosing circuit breaker 55.

While we have, for the sake of clearness and in order to disclose the invention so that the same can be readily understood, described and illustrated specific devices and arrangements, we desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described our invention, what we claim and desire to secure by Letters Patent is:

1. In a fault or overload protection device for branch line circuits of a power distribution system, the combination of a stationary contact, a vertically movable contact carrying member having a cooperating contact at the upper end thereof, a magnetic operating coil connected in series with said contacts and surrounding said vertically movable member, an armature of annular cross-section slidably mounted upon said contact carrying member and movable upwardly in response to magnetic attraction when said operating coil is energized by an overload current, holding means operating under normal conditions to retain said armature in cooperating relation with said operating coil, a step-by-step mechanism adapted to be operated by said armature in its upward movement, a latching mechanism at the lower end of said vertically movable member for retaining said contact carrying member with said contacts in closed circuit relation with respect to each other, and means associated with said step-by-step mechanism adapted to release said holding means and permit said armature to drop and release said latching mechanism after said step-by-step mechanism has been advanced a predetermined number of steps by said armature, whereby said vertically movable member will move downwardly and separate said circuit controlling contacts.

2. In a fault or overload protection device for branch line circuits of a power distribution system, the combination of a stationary contact, a vertically movable contact carrying member having a cooperating contact at the upper end thereof, a magnetic operating coil connected in series with said contacts and surrounding said vertically movable member, an armature of annular cross-section slidably mounted upon said contact carrying member and movable upwardly in response to magnetic attraction when said operating coil is energized by an overload current, holding means operating under normal conditions to retain said armature in cooperating relation with said operating coil, a step-by-step mechanism adapted to be operated by said armature in its upward movement, a latching mechanism at the lower end of said vertically movable member for retaining said contact carrying member with said contacts in closed circuit relation with respect to each other, means associated with said step-by-step mechanism adapted to release said holding means and permit said armature to drop and release said latching mechanism after said step-by-step mechanism has been advanced a predetermined number of steps by said armature, whereby said vertically movable member will move downwardly and separate said circuit controlling contacts, and manual reset means for restoring said vertically movably contact carrying member to its initial circuit closed position.

3. In a zero current overload responsive circuit interrupting device, the combination of a pair of cooperating contacts biased into an open circuit position, a latching means for retaining said contacts in closed circuit contact with each other, an electromagnetic coil connected in series circuit with said cooperating contacts, an armature arranged in cooperating relation with said electromagnetic coil having two limits of travel and adapted at one of its limits of travel to release said latching mechanism and permit a circuit opening operation of said contacts, means for limiting the movement of said armature short of its latch releasing limit of travel, a ratchet mechanism adapted to be operated in a step-by-step manner by said armature at its other limit of travel, and means controlled by said ratchet mechanism adapted to render said last means inoperative after a predetermined number of step-by-step operations thereof, whereby a circuit interrupting operation of said circuit controlling contacts will occur during a period of zero current following a predetermined number of step-by-step operations of said ratchet mechanism by said armature.

4. In a zero current overload responsive circuit interrupting device, the combination of a pair of cooperating contacts biased into an open circuit position, a latching means for retaining said contacts in closed circuit relation with each other, an electromagnetic coil connected in series circuit with said cooperating contacts, an armature arranged in cooperating relation with said electromagnetic coil having two extreme limits of travel and adapted at one of its extreme limits of travel to release said latching mechanism and permit a circuit opening operation of said contacts, means intermediate the limits of travel of said armature for preventing a release of said latching means by said armature, a ratchet mechanism adapted to be operated in a step-by-step manner by said armature at its other extreme limit of travel, and means controlled by said ratchet mechanism adapted to render said last means inoperative after a predetermined number of step-by-step operations thereof, whereby said armature will operate to release said latching means and permit said circuit controlling contacts to interrupt the circuit therethrough during a period of zero current in said electromagnetic coil.

5. In a zero current overload responsive circuit interrupting device, the combination of a pair of cooperating contacts biased into an open circuit position, a latching means for retaining said contacts in closed circuit relation with each other, an electromagnetic coil connected in series circuit with said cooperating contacts, an armature arranged in cooperating relation with said electromagnetic coil having two extreme limits of travel and adapted at one of its extreme limits of travel to release said latching mechanism and permit a circuit opening operation of said contacts, means intermediate the limits of travel of said armature for preventing a release of said latching means by said armature, a ratchet mechanism adapted to be operated in a step-by-step manner by said armature at its other extreme limit of travel, means controlled by said ratchet mechanism adapted to render said last means inoperative after a predetermined number of step-by-step operations thereof, whereby said armature will operate to release said latching means and permit said circuit controlling contacts to interrupt the circuit therethrough during a period of zero current in said electromagnetic coil, and a timing means associated with said ratchet mechanism adapted to prevent a release of said armature when said predetermined number of step-by-step operations thereof do not occur within a predetermined period of lapsed time.

6. In a zero current overload responsive circuit interrupting device, the combination of a pair of cooperating circuit controlling contacts, an electromagnetic coil connected in series circuit with said contacts, a member extending through said electromagnetic coil and supporting one of said contacts, a latch means for holding said member in an elevated position against the action of gravity and with said contacts in a circuit closed condition, an armature slidably mounted upon said member and adapted to be picked up and dropped as said electromagnetic coil is energized and deenergized by successive periods of abnormal current flow through said electromagnetic coil, said armature being adapted at its lower limit of travel to render said latch means inoperative and permit an opening of said circuit controlling contacts, means disposed intermediate the limits of travel of said armature adapted to prevent a latch releasing movement thereof, a ratchet pawl carried by said member and adapted to be operated by said armature at its upper limit of travel, and a ratchet bar disposed in cooperating relation with said ratchet pawl having means adapted to render said last means inoperative after a predetermined number of operations of said armature, whereby upon the next following period of zero current in said electromagnetic coil said armature will be free to render said latch means inoperative and permit said member to drop and move the contact carried thereby into a circuit open position.

7. In a zero current overload responsive circuit interrupting device, the combination of a pair of cooperating circuit controlling contacts, an electromagnetic coil connected in series circuit with said contacts, a vertically disposed member extending centrally through said electromagnetic coil and supporting one of said contacts at its upper end, a latch means engaging the lower end of said member for holding it in an elevated position against the action of gravity and with said contacts in a circuit closed condition, an armature slidably mounted upon said member and adapted to be picked up and dropped as said electromagnetic coil is energized and deenergized, said armature being adapted at its lower limit of travel to trip said latch means and permit a circuit opening operation of said circuit controlling contacts, means disposed in the path of travel of said armature adapted to prevent a latch releasing movement thereof, a ratchet engaging pawl carried by said member and adapted to be operated by said armature at its upper limit of travel, a ratchet bar disposed in cooperating relation with said ratchet engaging pawl having means adapted to render said last means inoperative after a predetermined number of operations of said armature, whereby upon the next following period of zero current in said electromagnetic coil said armature will be free to render said latch means inoperative and permit a circuit opening movement of the contact carried by said member, and a timing mechanism associated with said ratchet bar adapted to prevent a release of said armature by said holding means in the event that a predetermined number of successive operations of said armature do not occur within a predetermined period of lapsed time.

BRUCE O. WATKINS.
JOHN F. ATKINSON.